Sept. 16, 1947.        C. L. PHILLIPS        2,427,574
COMMUTATING FIELD CONTROL SYSTEM
Filed Dec. 18, 1944
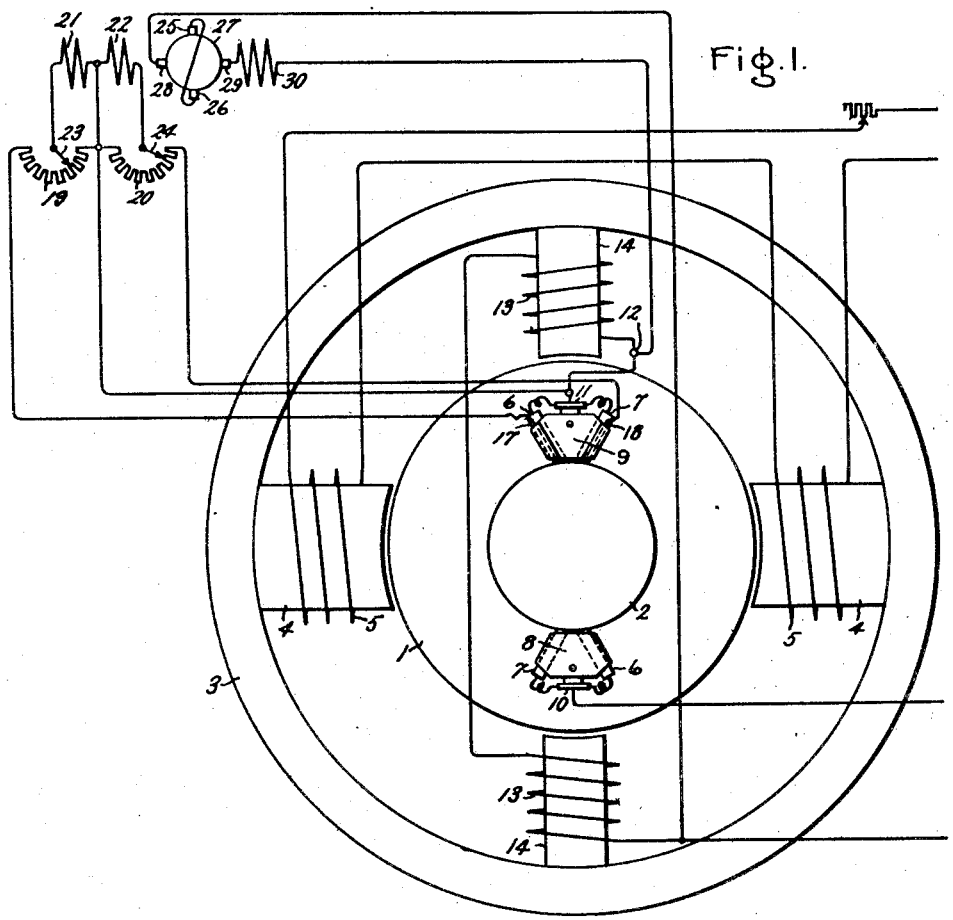
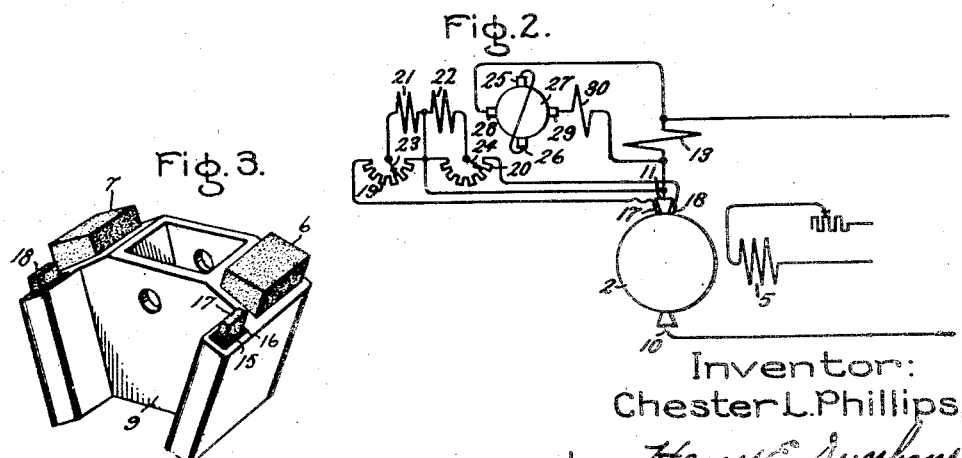
Inventor:
Chester L. Phillips,
by  Harry E. Dunham
His Attorney.

Patented Sept. 16, 1947

2,427,574

UNITED STATES PATENT OFFICE 2,427,574

COMMUTATING FIELD CONTROL SYSTEM

Chester L. Phillips, Vallejo, Calif., assignor to General Electric Company, a corporation of New York Application December 18, 1944, Serial No. 568,584

11 Claims. (Cl. 171—228)

My invention relates to dynamoelectric machines and particularly to such machines as are provided with commutating excitation by a field exciting winding.

An object of my invention is to provide an improved dynamoelectric machine having a commutating excitation which, either wholly or partly, is responsive to the voltage difference between the leading and trailing edges of the brushes of the machine.

Another object of my invention is to provide a commutating system for a dynamoelectric machine having main load brushes, which includes the arrangement of an amplidyne type dynamoelectric machine for amplifying variations in the voltage difference between the leading and trailing edge of a main load brush and providing commutating excitation which is responsive to such amplified variations in voltage difference for maintaining this voltage difference substantially constant at any desired value, substantially irrespective of the load on the machine or other factors bearing on the successful "black" commutation of the machine.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 illustrates a dynamoelectric machine provided with an embodiment of my invention; Fig. 2 is a schematic representation of the arrangement shown in Fig. 1; and Fig. 3 is an enlarged perspective view of a brush holder and brushes such as might be used in the construction shown in Figs. 1 and 2.

In commutating type dynamoelectric machines, it has been found that "black" commutation depends, among other things, upon the voltage difference between the leading and trailing edges of the main brush. This is particularly important where a plural brush arrangement is used, as the leading edge of a tandem brush may be displaced circumferentially around the commutator from the trailing edge of the other tandem brush considerably more than with a single brush. It is also desirable that the energization of a commutating field exciting winding should vary somewhat with the load current on the machine. In my improved construction, both of these factors are combined to provide the desired net excitation by a single commutating field exciting winding.

Referring to the drawing, I have shown a main dynamoelectric machine provided with an armature or rotatable member 1 having a conventional winding connected to a commutator 2. Main excitation is provided to this machine by a stationary member having a magnet frame 3 and main pole pieces 4 on which a main exciting winding 5 is arranged. Main brushes 6 and 7 are arranged in tandem in each of the brush holders 8 and 9, such that the brushes 6 and 7 are in tandem in contact with the peripheral surface of the commutator 2 and are both connected to the main studs 10 and 11 of the main brush holders 8 and 9, respectively. The main brush holder stud 10 is connected to one of the terminals of the machine while the main brush holder stud 11 is connected to a terminal 12 of a commutating field exciting winding 13 which is arranged about commutating pole pieces 14 mounted on the stationary member magnet frame 3, and the other end of the commutating field exciting winding 13 is connected to the other terminal of the machine. This provides a component of commutating excitation which is responsive to the load current in the armature winding of the machine. The main brush holder 9 is formed with special thin brush slots 15 which have an insulating lining 16 in which relatively narrow brushes 17 are arranged adjacent the leading edge of the leading main brush and adjacent the trailing edge of the trailing main brush, such that these auxiliary brushes 17 and 18 are insulated from the main brushes 6 nad 7 and are adapted to be at the voltage of the leading and trailing edges of the main brushes. Satisfactory operation can be obtained as shown by providing only one such brush holder per machine. In order to obtain a desired substantially constant voltage difference between the leading and trailing edges of the main brushes of the machine, a voltage difference responsive source of energization is connected across the commutating field exciting winding 13. This includes the connection of the leading auxiliary brush 17 to a potentiometer 19, and the connection of the other side of this potentiometer to the main brush stud 11; the connection of the trailing auxiliary brush 18 to one terminal of another potentiometer 20, the other terminal of which is connected to the same main brush stud 11. These two potentiometers are connected across a pair of opposed control field exciting windings 21 and 22 of a dynamoelectric machine of the armature reaction excited type, such as an amplidyne, so that the excitation provided by the control field exciting winding 21 is responsive to the difference in voltage between the leading auxiliary brush 17 and the main brush holder stud 11, while the excitation provided by the control field exciting winding 22 to the amplidyne is responsive to the voltage difference between the trailing brush 18 and the main brush holder stud 11. Under certain conditions, it is desirable that the voltage difference between the leading and trailing edges of the main brushes of the machine can be controlled, and this is obtained in my improved construction by connecting the amplidyne control field exciting windings 21 and 22 to the potentiometers 19 and 20, respectively, through variable control contactors 23 and 24 which not only provides for a definite variation in the response of the field exciting windings 21 and 22 to a definite voltage difference between the leading auxiliary brush 17 and the trailing auxiliary brush 18, but also provides for controlling the effective difference between the voltage at the leading edge of the leading brush and the voltage of the main brush holder and controlling the effective difference in the voltage between the trailing edge of the trailing brush and the main brush holder by independent variation of the control contactors 23 and 24 of the potentiometers 19 and 20, respectively. For normal conditions, the adjustment of the potentiometers 19 and 20 is made at the factory and remains fixed for the life of the machine. These two control field exciting windings 21 and 22 of the amplidyne machine provide the control excitation to this machine which induces a voltage between the primary brushes 25 and 26 of the amplidyne which are short circuited and which thereby produce a primary current through a primary circuit in the armature 27 of the amplidyne. This primary current produces a primary armature reaction which induces a voltage between the secondary or load brushes 28 and 29 of the amplidyne in which variations in the excitation between the field exciting windings 21 and 22 are amplified many times by the two-stage amplification operation of this type dynamoelectric machine. This type machine does not form a part of my invention, but is the invention of E. F. W. Alexanderson and M. A. Edwards and is described in Patent 2,227,992, January 7, 1941. The terminals of the secondary brush of the amplidyne are connected across the main dynamoelectric machine field exciting winding 13 through an amplidyne compensating field exciting winding 30. By this arrangement, the desired voltage difference between the leading and trailing edges of the main brushes of the main dynamoelectric machine is adapted to provide excitation to the amplidyne in such a manner that if the voltage difference between the leading brush 17 and the main brush holder stud 11 bears the proper relationship to the trailing brush voltage difference between the trailing brush 18 and the main brush holder stud 11, the component of excitation provided by the field exciting winding 21 will be exactly opposite to the component of excitation provided by the field exciting winding 22, and no current will be generated in the amplidyne, and, therefore, no current will flow into the commutating field exciting winding 13 of the main machine from the amplidyne, and the energization of this field exciting winding will then depend solely upon the load current of the armature. However, if the voltage difference between the leading edge and the trailing edge of the main brushes of the main dynamoelectric machine and the stud 11 of the main brush holder 9 does not bear the proper relationship and is not of the desired value, one or the other of the amplidyne field exciting windings 21 and 22 will produce a component of excitation greater than the other field exciting winding of the amplidyne machine so that the balance of excitation of the field exciting windings 21 and 22 will be disturbed and a voltage will be induced between the secondary brushes 28 and 29 of the amplidyne which will be considerably greater than the undesirable variation in the voltage difference between the leading and trailing edges of the main brushes of the main machine. This amplified voltage difference variation will be impressed across the commutating field exciting winding 13 of the main machine and will either add or subtract to the energization of this field exciting winding due to the main load current of the main dynamoelectric machine. Thus, any variation from the predetermined desired voltage difference between the leading and trailing edges of the main brushes is rapidly amplified by the amplidyne and provided as a correcting component of commutating excitation to the commutating field exciting winding 13 to substantially restore the voltage difference to the desired value. While other types of amplifiers might be used to provide the desired control of the commutating excitation of the main dynamoelectric machine, this type of dynamoelectric machine amplifier has been found to be particularly suitable for installations where relatively high currents and a rugged construction is of vital importance.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. In combination, a dynamoelectric machine having a rotatable member with a winding and a commutator connected thereto, a plurality of line brush sets for said commutator, means including a commutating field exciting winding energized in response to the load current of said line brushes for providing a commutating excitation to said machine, auxiliary brushes respectively adjacent the leading and trailing edges of one of said line brush sets, and means in circuit with said commutating field winding for amplifying a voltage dependent on a voltage difference between the leading and trailing edge auxiliary brushes whereby the commutating excitation of said machine is varied in response to said voltage difference.

2. In combination, a dynamoelectric machine having a rotatable member with a winding and a commutator connected thereto, a plurality of line brush sets for said commutator, means including a commutating field exciting winding energized in response to the the load current of said line brushes for providing a commutating excitation to said machine, auxiliary brushes respectively adjacent the leading and trailing edges of one of said line brush sets, and means in circuit with said commutating field winding for controlling and for amplifying a voltage dependent on a voltage difference between the leading and trailing edge auxiliary brushes whereby arranged to vary the commutating excitation of said machine is varied for maintaining substantially constant said voltage difference.

3. In combination, a main dynamoelectric machine having a rotatable member with a winding and a commutator connected thereto, a plurality of line brush sets for said commutator, means including a commutating field exciting winding energized in response to the load current of said line brushes for providing a commutating excitation to said main machine, auxiliary brushes respectively adjacent the leading and trailing edges of one of said line brush sets, and means including an amplidyne dynamoelectric machine in circuit with said commutating field winding and having an excitation system energized responsive to a voltage difference between the leading and trailing edge auxiliary brushes for amplifying said voltage difference whereby the commutating excitation of said main machine is varied in response to said amplified voltage difference.

4. In combination, a dynamoelectric machine having a rotatable member with a winding and a commutator connected thereto, a plurality of line brush sets for said commutator, means including a commutating field exciting winding energized in response to the load current of said line brushes for providing a commutating excitation to said machine, auxiliary brushes respectively adjacent the leading and trailing edges of one of said line brush sets, means including an amplidyne dynamoelectric machine in circuit with said commutating field winding having an excitation system energized responsive to a voltage difference between the leading and trailing edge auxiliary brushes for amplifying said voltage difference whereby the commutating excitation of said machine is varied in response to said amplified voltage difference to maintain said voltage difference substantially constant, and means for controlling said amplidyne excitation for controlling said voltage difference.

5. In combination, a main dynamoelectric machine having a rotatable member with a winding and a commutator connected thereto, brush holders with main brushes for said commutator, means including a commutating field exciting winding energized in response to the load current of said main brushes for providing commutating excitation to said main machine, auxiliary brushes arranged adjacent the leading and trailing edges of one of said main brush holders, an amplidyne dynamoelectric machine having an excitation system responsive to a voltage difference between the leading edge auxiliary brush and the trailing edge auxiliary brush, and means including said amplidyne for varying the commutating excitation of said main dynamoelectric machine for maintaining a substantially constant voltage difference between said leading and trailing edge auxiliary brushes.

6. In combination, a main dynamoelectric machine having a rotatable member with a winding and a commutator connected thereto, brush holders with main brushes for said commutator, means including a commutating field exciting winding energized in response to the load current of said main brushes for providing commutating excitation to said main machine, auxiliary brushes arranged adjacent the leading and trailing edges of one of said main brush holders, an amplidyne dynamoelectric machine having an excitation system responsive to a voltage difference between the leading edge auxiliary brush and the trailing edge auxiliary brush, and means connecting said amplidyne across said main dynamoelectric commutating field exciting winding for varying the energization of said commutating field exciting winding for maintaining a substantially constant voltage difference between said leading and trailing edge auxiliary brushes.

7. In combination, a main dynamoelectric machine having a rotatable member with a winding and a commutator connected thereto, brush holders with main brushes for said commutator, means including a commutating field exciting winding energized in response to the load current of said main brushes for providing commutating excitation to said main machine, auxiliary brushes arranged adjacent the leading and trailing edges of one of said main brush holders, an amplidyne dynamoelectric machine having a pair of opposed control field exciting windings connected for energization responsive to the voltage difference between the leading edge auxiliary brush and said one main brush holder and the voltage difference between the trailing edge auxiliary brush and said one main brush holder, and means including said amplidyne for varying the energization of said commutating field exciting winding for maintaining a substantially constant voltage difference between said leading and trailing edge auxiliary brushes.

8. In combination, a main dynamoelectric machine having a rotatable member with a winding and a commutator connected thereto, brush holders with main brushes for said commutator, means including a commutating field exciting winding energized in response to the load current of said main brushes for providing commutating excitation to said main machine, auxiliary brushes arranged adjacent the leading and trailing edges of one of said main brush holders, an amplidyne dynamoelectric machine having a pair of opposed control field exciting windings connected for energization responsive to the voltage difference between the leading edge auxiliary brush and said one main brush holder and the voltage difference between the trailing edge auxiliary brush and said one main brush holder, and means including said amplidyne for varying the commutating excitation of said main dynamoelectric machine for maintaining a substantially constant voltage difference between said leading and trailing edge auxiliary brushes.

9. In combination, a main dynamoelectric machine having a rotatable member with a winding and a commutator connected thereto, brush holders with main brushes for said commutator, means including a commutating field exciting winding energized in response to the load current of said main brushes for providing commutating excitation to said main machine, auxiliary brushes arranged adjacent the leading and trailing edges of one of said main brush holders, an amplidyne dynamoelectric machine having a pair of opposed control field exciting windings, means for energizing one of said amplidyne control field exciting windings by a voltage dependent on the voltage difference between the leading edge auxiliary brush and said one main brush holder, means for energizing the other of said amplidyne control field exciting windings by a voltage dependent on the voltage difference between the trailing edge auxiliary brush and said one main brush holder, and means including said amplidyne for varying the energization of said commutating field exciting winding for maintaining a substantially constant voltage difference between said leading and trailing edge auxiliary brushes.

10. In combination, a main dynamoelectric machine having a rotatable member with a winding and a commutator connected thereto, brush holders with main brushes for said commutator, means including a commutating field exciting winding energized in response to the load current of said main brushes for providing commutating excitation to said main machine, auxiliary brushes arranged adjacent the leading and trailing edges of one of said main brush holders electrically insulated from said main brushes, an amplidyne dynamoelectric machine having a pair of opposed control field exciting windings, means for energizing one of said amplidyne control field exciting windings by a voltage dependent on the voltage difference between the leading edge auxiliary brush and said one main brush holder, means for energizing the other of said amplidyne control field exciting windings by a voltage dependent on the voltage difference between the trailing edge auxiliary brush and said one main brush holder, and means connecting said amplidyne across said main dynamoelectric machine commutating field exciting winding for varying the energization of said commutating field exciting winding for maintaining a substantially constant voltage difference between said leading and trailing edge auxiliary brushes.

11. In combination, a main dynamoelectric machine having a rotatable member with a winding and a commutator connected thereto, brush holders with main brushes for said commutator, means including a commutating field exciting winding energized in response to the load current of said main brushes for providing commutating excitation to said main machine, auxiliary brushes arranged adjacent the leading and trailing edges of one of said main brush holders electrically insulated from said main brushes, an amplidyne dynamoelectric machine having a pair of opposed control field exciting windings, means for energizing one of said amplidyne control field exciting windings by a voltage dependent on the voltage difference between the leading edge auxiliary brush and said one main brush holder, means for energizing the other of said amplidyne control field exciting windings by a voltage dependent on the voltage difference between the trailing edge auxiliary brush and said one main brush holder, means for varying the energization of said amplidyne control field exciting windings relative to the voltage differences between the leading and trailing edge auxiliary brushes and said one main brush holder, and means connecting said amplidyne across said main dynamoelectric commutating field exciting winding for varying the energization of said commutating field exciting winding for maintaining a substantially constant voltage difference between said leading and trailing edge auxiliary brushes.

CHESTER L. PHILLIPS.

REFERENCES CITED

The following references are of record in the file of this patent:

UNITED STATES PATENTS

| Number | Name | Date |
|---|---|---|
| 1,059,134 | Fornander | Apr. 15, 1913 |
| 1,335,144 | Walker | Mar. 30, 1920 |
| 1,393,141 | Kostko | Oct. 11, 1921 |

FOREIGN PATENTS

| Number | Country | Date |
|---|---|---|
| 3,777 | Great Britain | 1903 |